United States Patent [19]

Inoue et al.

[11] Patent Number: 4,933,590
[45] Date of Patent: Jun. 12, 1990

[54] ULTRASONIC MOTOR

[75] Inventors: Takeshi Inoue; Osamu Ohnishi; Osamu Myohga; Sadayuki Takahashi; Tadao Uchikawa, all of Tokyo, Japan

[73] Assignee: NEC Corporation, Tokyo, Japan

[21] Appl. No.: 322,212

[22] Filed: Mar. 13, 1989

[30] Foreign Application Priority Data

Mar. 11, 1988 [JP] Japan .................................. 63-58649

[51] Int. Cl.$^5$ ............................................ H01L 41/08
[52] U.S. Cl. ..................................... 310/323; 310/328
[58] Field of Search ............... 310/323, 328, 316, 317, 310/333, 325

[56] References Cited

U.S. PATENT DOCUMENTS

| 4,210,837 | 7/1980 | Vasilieu et al. | 310/323 |
| 4,663,556 | 5/1987 | Kumada | 310/323 X |
| 4,681,667 | 7/1987 | Utsumi et al. | 204/15 |
| 4,705,980 | 11/1987 | Mishiro | 310/325 X |
| 4,728,843 | 3/1988 | Mishiro | 310/325 |
| 4,764,702 | 8/1988 | Mishiro | 310/323 |
| 4,812,697 | 3/1989 | Mishiro | 310/323 |

FOREIGN PATENT DOCUMENTS

| 3433768 | 4/1985 | Fed. Rep. of Germany | 310/323 |
| 0113672 | 6/1985 | Japan | 310/323 |
| 0148387 | 8/1985 | Japan | 310/323 |
| 0052163 | 3/1986 | Japan | 310/323 |
| 0054883 | 3/1986 | Japan | 310/323 |
| 0196773 | 8/1986 | Japan | 310/323 |
| 0060480 | 3/1987 | Japan | 310/323 |
| 0060481 | 3/1987 | Japan | 310/323 |
| 0092779 | 4/1987 | Japan | 310/323 |
| 0095981 | 5/1987 | Japan | 310/323 |
| 0217875 | 9/1987 | Japan | 310/323 |
| 0670992 | 6/1979 | U.S.S.R. | 310/325 |

OTHER PUBLICATIONS

"A Piezoelectric Ultrasonic Motor", Kumada, Japanese Journel of Applied Physics, vol. 24, Supplement 24-2, pp. 739-741 (1985).

Primary Examiner—Mark O. Budd
Attorney, Agent, or Firm—Burns, Doane, Swecker & Mathis

[57] ABSTRACT

This invention provides an ultrasonic motor using a bolt-tightened Langevin type torsional vibrator as a stator. The stator produces a vibrational energy to be converted into a rotational energy for a rotor contacted with the stator. The rotor is provided between a piezoelectric actuator and the torsional vibrator so that the contact state between the rotor and the torsional vibrator is controlled either one of loose contact and tight contact therebetween. According to the present invention, since the piezoelectric actuator is slidingly combined to the rotor, the rotation energy is not applied to the piezoelectric actuator and thus the life time of the actuator becomes long.

6 Claims, 2 Drawing Sheets

ULTRASONIC MOTOR

BACKGROUND OF THE INVENTION

This invention relates to an ultrasonic motor and more particularly, to an ultrasonic motor which is driven by exciting ultrasonic vibration on a piezoelectric vibrator as a stator and rotating a rotor which is contact-pressed upon the piezoelectric vibrator via a frictional force therebetween.

An ultrasonic motor is a motor based on a novel principle and is given rotational force from ultrasonic vibration. Compared to the conventional electromagnetic motors based on the interaction between the electric current and magnetic fields, it has such entirely different features as low speed and high torque. More particularly, the torque per unit volume is extremely large, and the motor can be driven without gears and brakes if it is used at low speed. Another feature is that its response is superior as its inertial mass is small and the static retention of the rotor is large.

There have been proposed various ultrasonic motors, and researches have actively been made on them. For instance, a traveling wave type ultrasonic motor utilizes deflection vibration which is generated on the circumference of a stator comprising a piezoelectric ceramic plate attached on an elastic disk. The traveling waves which are traveling chronologically are excited on the stator by either two-phase or multiphase driving method to rotate the rotor pressed tightly on the surface of the stator. However, these traveling wave type ultrasonic motors have a large compliance of the stator compared to the rotor as they use bending mode traveling waves. Such motors therefore cannot easily obtain high driving force (e.g. torque of 1 Kgf-cm or higher with the diameter of 2 cm) while it can achieve middle range of the driving force relatively easily. Further the degree of freedom in design is small as the ultrasonic motors of bending mode traveling wave type generate driving force only with resonance.

SUMMARY OF THE INVENTION

The purpose of the present invention is to provide an ultrasonic motor which is completely free of aforementioned problems encountered in the prior art.

In order to achieve the object, this invention provides an ultrasonic motor which converts vibrational energy of a vibrator to rotational energy for a rotor through a frictional force. The ultrasonic motor of this invention comprises a torsional vibrator of Langevin type which is tightened with a bolt and acts as a stator. The rotor is sandwiched between a piezoelectric actuator and the bolt-tightened Langevin-type torsional vibrator. The rotor and the torsional vibration is slidingly contacted to each other so as not to transfer the rotation energy of the rotor to the piezoelectric actuator while the tight contact between the rotor and the torsional vibrator is obtained. The piezoelectric actuator is driven in non-resonance mode while the torsional vibrator is driven in resonance mode.

DESCRIPTION OF THE PREFERRED EMBODIMENTS

Figure 1:
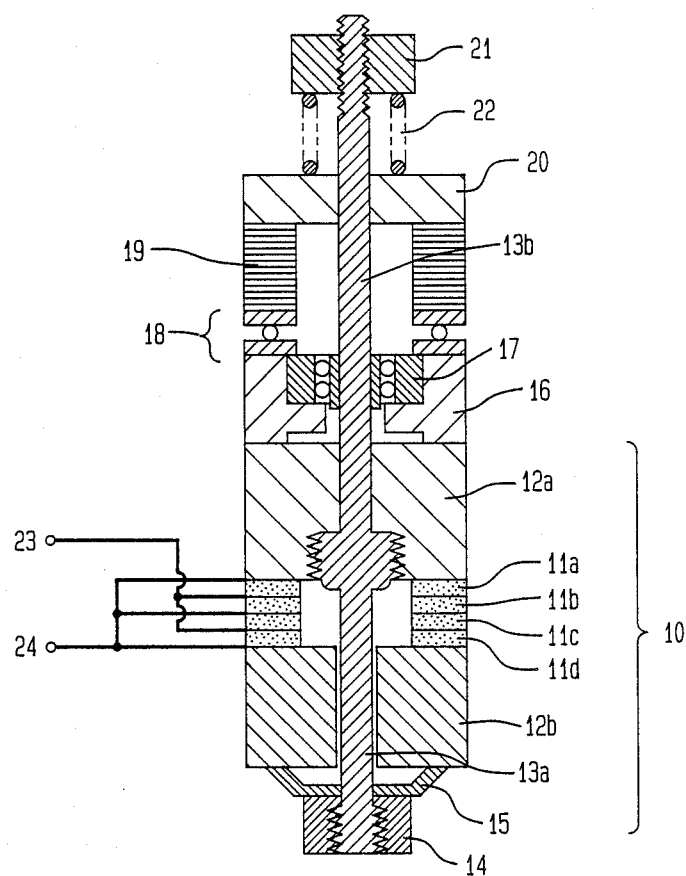
FIG. 1 is a cross sectional view of the first embodiment of an ultrasonic motor according to this invention.

Referring to FIG. 1, a bolt-tightened type Langevin torsional vibrator 10 has ring-shaped piezoelectric elements 11a, 11b, 11c, 11d made of piezoelectric ceramics of lead zirconate titanate system that are held between metal blocks 12a and 12b. Those piezoelectric elements are polarized in the circumferential direction and are firmly attached to each other via electrode plates made of Cu or the like with organic adhesives such as epoxy resin or soldering. A pair of piezoelectric elements 11a and 11c is polarized in the direction opposite to that of the pair of piezoelectric elements 11b and 11d. For example, if the pair of piezoelectric elements 11a and 11c is polarized clockwise, the pair of piezoelectric elements 11b and 11d is polarized counterclockwise. The piezoelectric elements 11a, 11b, 11c, 11d are formed with electrodes on the upper and lower surfaces by sputtering, plating or vapor deposition so as to form electric terminals in parallel. Because of the principle of the torsional vibrators, the polarizing directions of adjacent piezoelectric elements become opposite to each other at a member for converting torsional vibration where the piezoelectric elements are in multi-layer. The bolt-tightened Langevin type torsional vibrator is reported in Japanese Journal of Applied Physics, Vol. 24 (1985), pp. 739–741.

The cylindrical metal blocks 12a, 12b are connected with a bolt 13a and a nut 14 so that static pressure is applied on the piezoelectric elements 11a, 11b, 11c, 11d. A plate spring 15 is provided to minimize the change in the pressure imposed on the piezoelectric elements by temperature changes which would otherwise be caused due to the difference in thermal expansion coefficient of components of the torsional vibrator 10.

A rotor 16 is provided adjacent to the metal block 12a. Inside the rotor 16 is mounted a bearing type sliding element 17 which is moved with rolling friction of smaller frictional coefficient.

A laminated piezoelectric actuator 19 of a ring shape is fixed on a seat 20, and is coupled with the ring-shaped rotor 16 via a bearing type sliding element 18. A piezoelectric actuator 19, the rotor 16, and the torsional vibrator 10 are pressed to each other with static pressure when they are not actuated.

A combination of a bolt 13b, a helical spring 22, and a nut 21 forms a static pressure applying means. When the rotor 16 is rotated, the bearing type sliding element 18 prevents the piezoelectric actuator 19 from rotating interlockingly. As is obvious from the description of the structure above, the ultrasonic motor according to this invention is advantageous in that, unlike the conventional traveling wave type ultrasonic motors, it has a vibrational node on the torsional vibrator 10 and therefore supporting and fixing are relatively simple. For instance, if the node is designed to exist between the piezoelectric element 11a and the metal block 12a, it becomes possible to package an ultrasonic motor on another system simply by inserting a ring-like supporting plate (not shown) of a diameter larger than that of the vibrator between the piezoelectric element 11a and the metal block 12a, and fixing the supporting plate while minimizing the dissipation of oscillation energy from the support.

A this ultrasonic motor has only piezoelectric elements 11a, 11b, 11c and 11d that are attached with adhesives, and a large static compression bias stress is constantly imposed on those attached portions, it has an extremely large mechanical strength. The motor has structurally a large mechanical strength as no other components are attached with adhesives.

As is disclosed in U.S. Pat. No. 4,681,667 issued on July 21, 1987, the piezoelectric actuator 19 used in the ultrasonic motor according to this invention has laminated internal electrodes (of which distance between electrodes is from 30 μm to 200 μm), and can be made with laminate ceramic technique. This invention actuator can move with a large longitudinal effect at a high electric-mechanical conversion efficiency to thereby achieve a large electrostrictive effect with a low voltage. Needless to say, motor as the actuator, a conventional structure may be used where piezo-ceramic plates and electrodes are alternately combined. While the torsional vibrator 10 is driven in a resonant mode, the actuator is excited in non-resonant mode by being aligned with the resonant frequency of the torsional vibrator 10. Although the size of the torsional vibrator 10 has to be determined at the stage of designing in order to be aligned with the desired resonant frequency, the actuator is not restricted in size as it is driven in non-resonant mode. But as it well known, the taller the height of an actuator, the larger becomes in longitudinal vibration displacement in total. Therefore, in order to determine driving frequency of the ultrasonic motor, it suffices if only the resonant frequency of the torsional vibrator is determined. The designing becomes extremely easy compared with the conventional traveling wave type ultrasonic motors and the degree of freedom in design increases. Torsional vibrator 10 is actuated in the torsional mode of a columnar rod or the movement similar to wringing of a napkin with hands, as is well known in the converter of the mechanical channel filter using the torsional mode. The torsional vibrator 10 can therefore produce clockwise and counterclockwise rotational forces alternately at the resonant frequency Fr.

In the ultrasonic motor according to this invention, the piezoelectric actuator 19 is connected with a transmitter and an amplifier via a phase shifter which can freely shift the driving voltage phase, and with electric terminals 23 and 24 leading out from the ring shaped piezoelectric elements 11a, 11b, 11c, 11d with the same transmitter but with a different amplifier. In order to rotate the rotor 16 counterclockwise, the piezoelectric actuator 19 is expanded in synchronism with the upper surface of the torsional vibrator 10 as it is twisted counterclockwise, whereby the rotor 16 is strongly pressed on the vibrator 10 instantaneously and then subjected to counterclockwise rotational force via the frictional force. Further, when the upper surface of the torsional vibrator 10 is rotated clockwise during the subsequent half-cycle, the contact pressure between the torsional vibrator 10 and the rotor 16 during the aforementioned half-cycle can be minimized by contracting the piezoelectric actuator. Accordingly, smooth rotation in the counterclockwise direction can be realized by using the rotor 16 as a clutch. Conversely, when the rotor is to be rotated clockwise, the phase of the piezoelectric actuator is further advanced by 180° F. so as to rotate the upper surface of the torsional vibrator 10 in the clockwise direction and to elongate the piezoelectric actuator 19.

An ultrasonic motor of a diameter of 2 cm was made on trial in order to examine the performance of this invention structure. The metal blocks 12a, 12b were made of titanium alloy, the rotor 16 stainless steel, the piezoelectric elements 11a, 11b, 11c and 11d piezo-ceramics of lead zirconate titanate system, the bolts 13a, 13b and the nuts 14, 21 Cr-Mo steel and the piezoelectric actuator piezo-ceramics of lead zirconate titanate system.

The resonant frequency of the torsional vibrator was set at 35 KHz, and the applied voltage at 100 Vp-p. When the piezoelectric actuator was driven at the applied voltage of 4 V, and the phase shifted by 60° F., the torque as high as 2.8 Kgf-cm wa easily obtained. This value is about thirty times as much as the traveling wave type ultrasonic motor of the same diameter or of 2 cm.

Needless to say, the piezoelectric actuator may be driven with pulses in the direction not to decrease polarization of the actuator. This is another feature of the piezoelectric actuators which operate in nonresonant mode.

Figure 2:
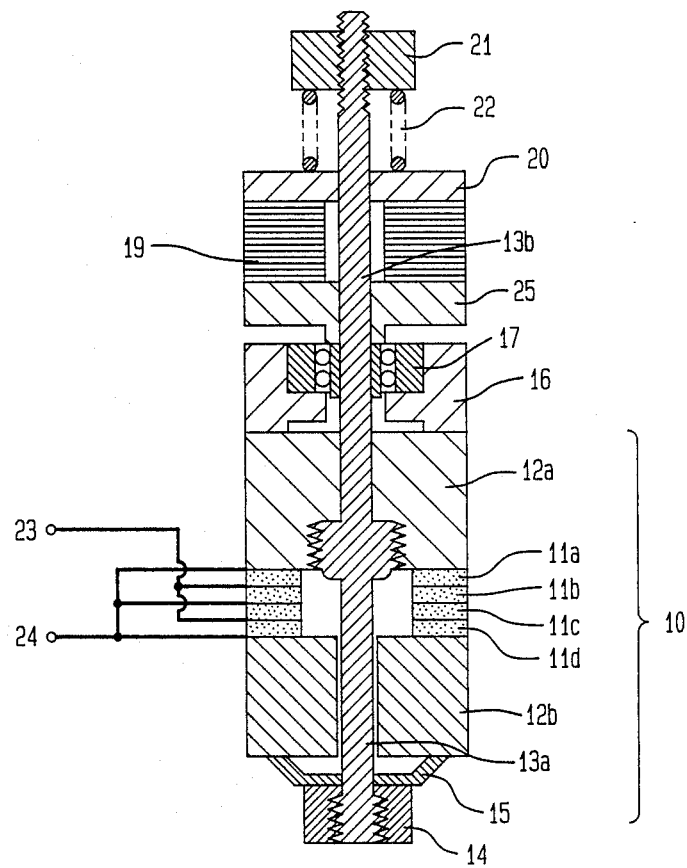
FIG. 2 is a cross sectional view of the second embodiment of an ultrasonic motor according to this invention.

Referring now to FIG. 2, the second embodiment will be explained. The second embodiment uses seat 25 with projections instead of the bearing type sliding element 18. The innermost portion of the bearing type sliding element 17 inside the rotor 16 has a portion abutting on the projections of the seat 25 because it rarely rotates even if the rotor 16 rotates because of the structure thereof. Thanks to the unique structure, a simple construction is realized without deteriorating the performance of the ultrasonic motor shown in FIG. 1. The bolts 13a and 13b may be divided into two pieces respectively. The diameter of the rotor 16 may be either larger or smaller than that of the vibrator. The sliding members 17, 18 are described to have bearings in the above statement, but they may be omitted so long as the rotor can slide smoothly against the bolts and the actuator. The same effect may be achieved by improving the rotor surface quality or coating.

As described in the foregoing explanation, the present ultrasonic motor has a structure where a rotational rotor is sandwiched between a pair of stators of a non-rotational torsional vibrator and a non-rotational piezoelectric actuator. Such structure is advantageous in the following aspects:

(1) The direction of rotation may be switched either to the normal or reverse direction, and yet the ultrasonic motor can achieve a large torque.

(2) As the piezoelectric actuator is driven in non-resonant mode, the driving frequency of the ultrasonic motor is determined almost exclusively by the resonant frequency of the torsional vibrator to thereby facilitate the design and increase the degree of freedom therein.

(3) As the use of adhesive is limited only to the piezoelectric element of the torsional vibrator, and as the element is under a large static compression bias stress, the ultrasonic motor according to this invention is extremely rigid mechanically and is easy to manufacture.

(4) Since the piezoelectric actuator is contacted to the rotor via a sliding means, the rotation energy of the rotor is not transferred to the actuator. Thus the life-time of the piezoelectric actuator is made long.

What is claimed is:

1. An ultrasonic motor comprising: a bolt-tightened Langevin type torsional vibrator having a multi-layered vibrator disposed between a pair of supporting members fixed by a bolt penetrating therethrough, a rotor provided onto one of said supporting members and combined with said bolt in a freely rotatable manner around said bolt, a piezoelectric actuator provided on said rotor, via a sliding member sandwiched between said rotor and said piezoelectric actuator in such a manner that a rotational energy of said rotor is not transferred to said piezoelectric actuator, a nut coupled to said bolt penetrating said rotor, said sliding member and said piezoelectric actuator, and a spring member sandwiched between said nut and said piezoelectric actuator so as to apply a static pressure among said torsional vibrator, rotor, sliding member, piezoelectric actuator and nut, whereby a frictional force between said rotor and one of said supporting members is enhanced when said piezoelectric actuator is expanded in an axial direction of said bolt so as to rotate said rotor without rotating said piezoelectric actuator and said frictional force is reduced when said piezoelectric actuator is contracted in said axial direction of said bolt so as not to rotate said rotor.

2. The ultrasonic motor as claimed in claim 1, wherein said sliding member is of a ball bearing type and said spring member is a coil spring.

3. The ultrasonic motor as claimed in claim 2 further comprising: a plate spring provided onto the other one of said supporting members and pressed by an additional nut coupled to said bolt protruded from said other one of said supporting members.

4. An ultrasonic motor comprising: a bolt-tightened Langevin type torsional vibrator having a multi-layered vibrator sandwiched between first and second supporting members fixed by a bolt penetrating therethrough, a rotor combined with said bolt protruded from said first supporting member, said rotor having a contact surface contacted with a surface of said first supporting member, a piezoelectric actuator provided on said rotor, a bearing type sliding member sandwiched between said rotor and said piezoelectric actuator such that a rotational force of said rotor cannot be transferred to said piezoelectric actuator, and a means for applying a static pressure among said piezoelectric actuator, said sliding member, said rotor and said first supporting member, whereby a frictional force between said rotor and said first supporting member is enhanced when said piezoelectric actuator is expanded in an axial direction of said bolt so as to rotate said rotor without rotating said piezoelectric actuator, and said frictional force is reduced when said piezoelectric actuator is contracted in said axial direction of said bolt so as not to rotate said rotor.

5. An ultrasonic motor comprising: a bolt-tightened Langevin type torsional vibrator having a multi-layered vibrator sandwiched between first and second supporting members fixed by a bolt penetrating therethrough, a first nut fixed to one end of said bolt protruding from said first supporting member, a plate spring sandwiched between said first nut and said first supporting member, a rotor combined with said bolt protruding from said second supporting member such that said rotor is rotatable around said bolt, a bearing type sliding member provided onto said rotor, a ring-shaped laminated piezoelectric actuator provided onto said sliding member such that said bolt is penetrated through said sliding member and said piezoelectric actuator, a second nut fixed to the other end of said bolt protruding from said piezoelectric actuator, and a coil spring sandwiched between said second nut and said piezoelectric actuator for applying a static pressure among said piezoelectric actuator, said bearing type sliding member, said rotor and said second supporting member.

6. An ultrasonic motor comprising: a bolt-tightened Langevin type torsional vibrator having a multi-layered vibrator sandwiched between first and second supporting members fixed by a bolt penetrating therethrough, a ball bearing member attached to said bolt at a portion protruded from said first supporting member, a rotor fixed to said ball bearing member so as to rotate freely around said bolt, said rotor having a contact surface contacted with said first supporting member, a disk member coupled to said bolt protruded from said ball bearing member, said disk member having a protruding portion around said bolt to contact with said ball bearing member without contacting said rotor, a ring-shaped piezoelectric actuator provided onto said disk member, a nut member fixed to said bolt protruded from said piezoelectric actuator, and a spring element sandwiched between said nut member and said piezoelectric actuator for integrally combining said piezoelectric actuator, said disk member, said ball bearing member, said rotor and said torsional vibrator, whereby a frictional force between said contact surface of said rotor and said first supporting member is enhanced when said piezoelectric actuator is expanded in an axial direction of said bolt so as to rotate said rotor without rotating both of said disk member and said piezoelectric actuator, and said frictional force is reduced when said piezoelectric actuator is contracted in said axial direction of said bolt so as not to rotate said rotor.

* * * * *